April 1, 1952 C. H. MILLERWISE 2,591,581
TRIP AND RESET MECHANISM FOR FLOAT OPERATED
LIQUID FUEL CONTROLLING VALVES
Filed July 9, 1949 2 SHEETS—SHEET 1

INVENTOR.
Carl H. Millerwise
BY
Andrew K. Foulds
his ATTORNEY

April 1, 1952 C. H. MILLERWISE 2,591,581
TRIP AND RESET MECHANISM FOR FLOAT OPERATED
LIQUID FUEL CONTROLLING VALVES
Filed July 9, 1949 2 SHEETS—SHEET 2

INVENTOR.
Carl H. Millerwise
BY
Andrew K. Jueds
his ATTORNEY

UNITED STATES PATENT OFFICE 2,591,581

TRIP AND RESET MECHANISM FOR FLOAT OPERATED LIQUID FUEL CONTROLLING VALVES

Carl H. Millerwise, Detroit, Mich., assignor to Detroit Lubricator Company, Detroit, Mich., a corporation of Michigan Application July 9, 1949, Serial No. 103,824

13 Claims. (Cl. 137—68)

This invention relates to new and useful improvements in liquid level controlling devices and more particularly to trip mechanisms for closing the inlet valve to a float chamber.

One of the objects of this invention is to provide a new and improved float operated fuel controlling valve structure having a novel trip and reset mechanism for closing the inlet valve thereof.

Another object is to provide a float operated valve structure having a novel valve closing means which may be tripped either in response to liquid level in the float chamber or thermostatically or manually.

Another object is to provide a novel actuating mechanism which, when combined with the float valve structure having a valve closing trip mechanism provides a simple means for tripping the valve closing mechanism manually or thermostatically and providing a simple manual reset mechanism.

Another object is to provide a novel trip mechanism assembly which may be secured to or removed from the casing of a float operated valve structure as a unitary control mechanism.

Other objects will become apparent from time to time throughout the specification and claims as hereinafter related.

This invention comprises the new and improved construction and combination of parts and their cooperative relation to each other which will be described more fully hereinafter and the novelty of which will be particularly pointed out and distinctly claimed.

Figure 1:
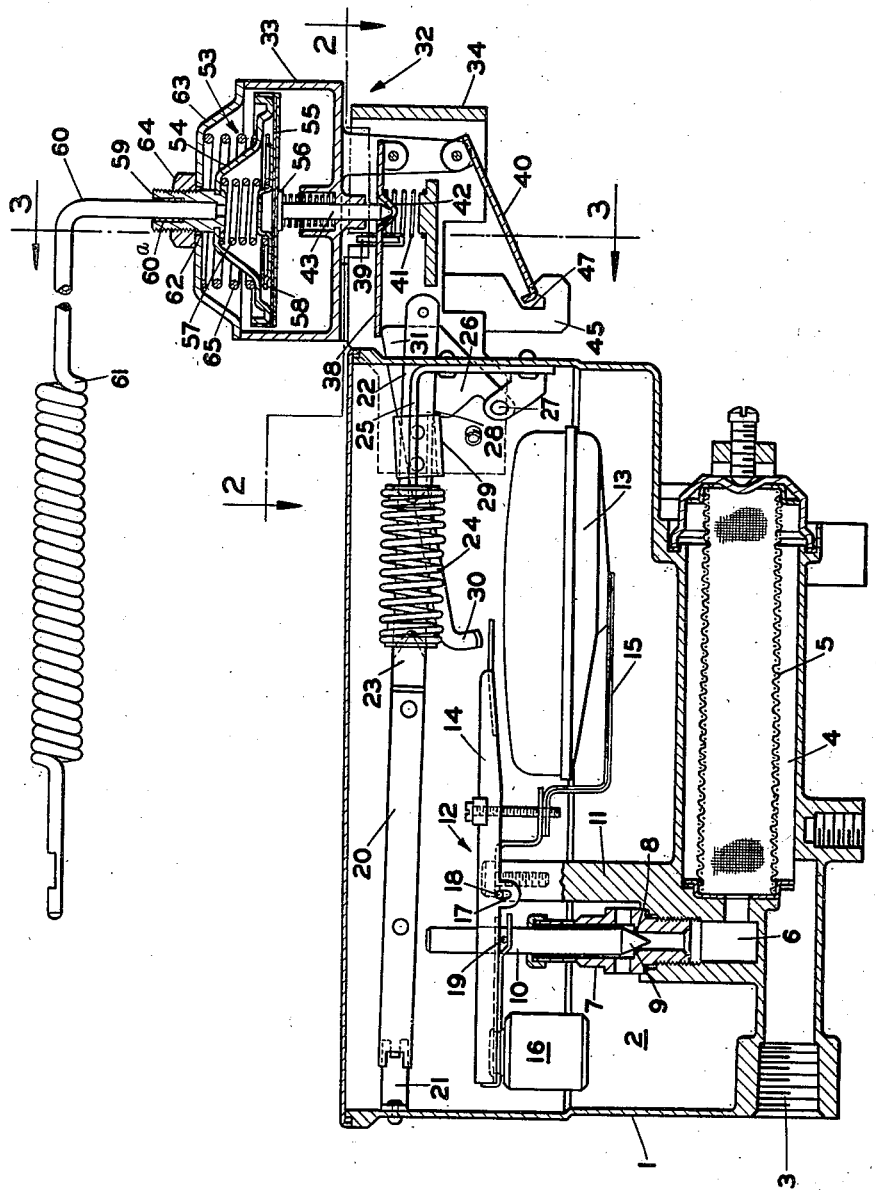
Figure 2:
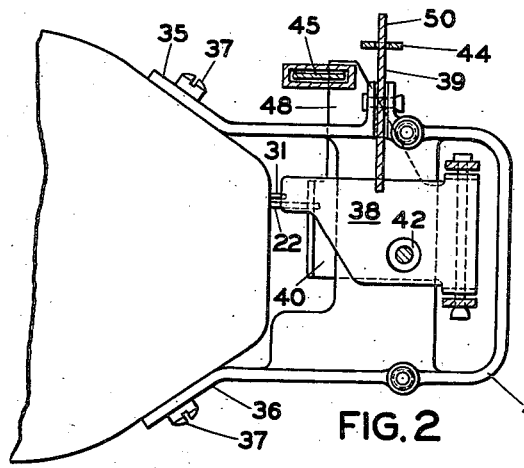
Figure 3:
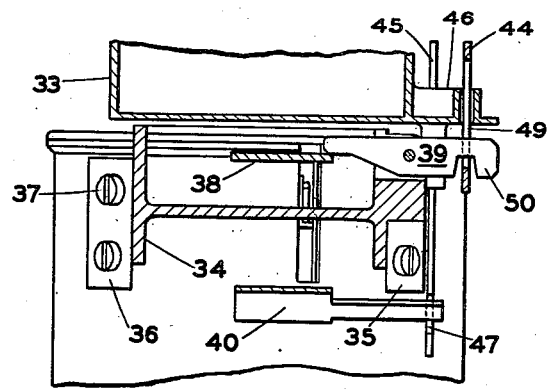
Figure 4:
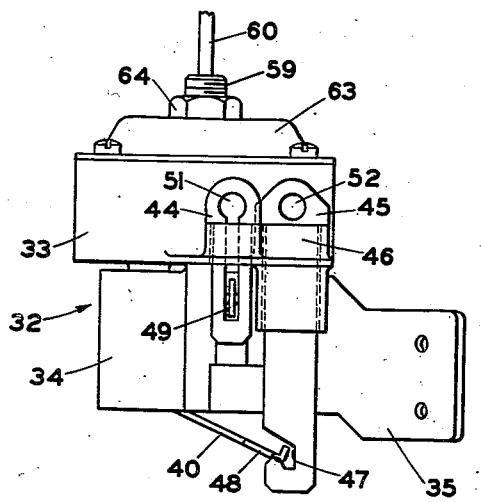

In the accompanying drawings to be taken as part of this specification there is clearly and fully illustrated a preferred embodiment of this invention in which drawings:

Figure 1 is a view in vertical section of a float operated valve structure having secured at one end thereof a novel trip mechanism assembly, Fig. 2 is a view taken on the section line 2—2 of Fig. 1 and shows the actuating levers of this trip mechanism, Fig. 3 is a view taken on the section line 3—3 of Fig. 1 and shows the interconnection of certain of the levers of the trip mechanism, and Fig. 4 is a rear elevation of the trip and reset mechanism removed from the float valve casing.

Referring to the drawings the particular float valve assembly shown is substantially the same as that shown in Patent 2,317,556 to P. S. Russel, but will be described in some detail to provide a proper setting for this invention which resides at least partially in the overall combination disclosed, There is a hollow casing 1 having a liquid receiving chamber or reservoir 2 which is supplied with liquid through an inlet passageway 3 opening into a chamber 4 in which is positioned a strainer 5. A passageway 6 interconnects the strainer chamber 4 and the reservoir 2 and opens through the bottom wall of the casing 1 into a guide sleeve 7 having a valve seat 8 through which liquid discharges into the reservoir 2. There is a valve member 9 having a stem portion 10 guided in the guide sleeve 7, the valve 9 cooperating with the valve seat 8 to control flow into the reservoir 2. Positioned within the reservoir 2 there is a supporting projection or post 11 which provides a fulcrum for a float assembly generally designated as 12. The float assembly 12 comprises a two-compartment float 13 secured to a lever member 14 by a bimetallic compensating arm 15 and counter-balanced by a weight 16. The lever 14 has a slotted portion 17 through which extends a supporting fulcrum pin 18 carried by the supporting post 11, the slot 17 permitting lost motion of the lever 14 upward relative to the fulcrum pin 18. The lever 14 is connected to the valve stem 10 as at 19 and is operable to modulate the position of the valve 9 relative to the valve seat 8 upon movement of the float 13 in response to variations in liquid level in the reservoir 2. There is a valve closing mechanism comprising a lever and reset member 20 fulcrumed at one end of the casing 1 on a bracket 21 and extending across the length of the reservoir 2 in overlying relation to the valve stem 10. The lever 20 is bifurcated at its right end and has an extended prong or arm 22 extending exterior of the casing 1 through a slot in the wall thereof. The other prong 23 of the lever 20 is a shorter one and engages one end of a toggle spring 24, the other end of which is supported by a bracket 25 carried by the slotted end wall of the valve casing. The toggle spring 24 biases the lever 20 continually toward engagement with the end of the valve stem 10. There is a trip or latch member 26 which is pivoted on the bracket 25 as at 27 and which has a notched portion 28 receiving one edge of a catch member 29 carried by the lever projecting portion 22 and restraining the lever 20 in a spaced relation to the valve stem 10. The latch member 26 has a projecting portion 30 within the casing 1 which counter-balances it toward latching engagement with the catch member 29 and has a second projecting portion 31 extending outside the casing through the same slot through which extends the end of the lever portion 22. Secured on the slotted end of the casing 1 is an auxiliary casing generally designated as 32 comprising an upper power element casing 33 and a lower casing portion 34 housing the trip mechanism and having projecting portions 35 and 36 for connection to the valve casing as by screws or bolts 37. Within the lower casing portion 34 there are pivotally supported three levers designated as 38, 39, and 40. The term "lever" as used hereinafter throughout this specification and in the claims is defined as and intended to cover the mechanical equivalents of "levers" whether they be flexible or rigid, straight, curved, or bent so long as they perform the desired function of motion transmission. The lever 38 is loaded upward by a spring 41 and has a recessed portion 42 which receives a thrust transmitting pin 43 for operation thereof. The free end of the lever 38 engages the exterior portion 31 of the latch member 26 and is operable upon movement to trip the latch member 26 and release the lever 20 for closing engagement with the valve stem 10. The lever 39 extends transversely of the casing portion 34 (see Fig. 3) and engages the lever 38 to provide a manual means of operation thereof. The lever 40 has its free end portion engageable with the projecting end portion of the lever portion 22 and is operable to move the lever 20 upward into latching relation with the latch member 26 after the mechanism has been tripped. There are a pair of linkages 44 and 45 which are reciprocally and vertically carried in a slotted bracket portion 46 on the side wall of the casing 32. The linkage 45 has an aperture or notch 47 in its lower end portion which engages a lateral projection 48 on the lever 40 for moving the same upward for resetting of the lever 20. The linkage 44 has a slot 49 at its lower end portion which receives the end portion 50 of the lever 39 and is operable upon upward movement to pivot the lever 39 to engage and move the lever 38 downward to trip the latch member 26. The linkages 44 and 45 are each apertured as at 51 and 52 to provide for connection to a remote operated linkage to permit remote manual tripping and resetting of the valve closing mechanism. Within the upper casing portion 33 there is positioned a power element structure generally designated as 53. The power element structure 53 comprises a cup-shaped casing member 54 which is closed at its open end by a flexible diaphragm 55 which abuts the flanged end 56 of the thrust transmitting pin 43. Within the cup-shaped casing 54 there is a spring 57 which abuts the casing 54 at one end and a thrust transmitting plate 58 at the other end overlying the diaphragm 55. The cup-shaped casing member 54 is apertured at its base and has secured therein a tubular sleeve member 59 in which is secured one end of a capillary tubing 60, sealed as at 60$^a$ by solder, the other end of which has thereon a feeler bulb portion designated as 61. The tubular extension 59 extends through an aperture 62 in the cover member 63 of the upper casing 33 and is movable therein. There is a nut 64 which is screw-threadedly secured on the sleeve 59 and which defines the power element position relative to the casing cover 63, the power element being held with the nut 64 abutting the cover 63 by a spring 65 within the upper casing 33. The nut 64 is operable upon adjustment to move the power element 53 bodily and thereby to determine the temperature of response required for actuation of the lever 38.

In operation this valve structure is intended to control the flow of liquid fuel to a liquid fuel burner. The fuel enters the casing 1 through the inlet 3, chamber 4, passage 6 and tubular inlet member 7. The valve member 9 controls the inflow of liquid fuel to the reservoir 2 and the fuel would normally be discharged from the reservoir through a conventional metering valve, the structure of which is not shown herein. The valve member 9 is modulated relative to the valve seat 8 by the float 13 which rises and falls according to liquid level in the reservoir 2. If the valve member 9 should not close completely and fuel should continue to enter the reservoir 2, upon increase of liquid level the float member 13 would rise thus causing the lever 14 to move upward and engage the end portion 30 of the latch member 26, this upward movement being permitted by the lost motion slot 17. When the lever end portion 14 engages the end portion 30 of the latch member 26 and moves the same out of latching engagement with the lever arm 22, the lever 20 is released for downward movement by the spring 24 and will strike the valve stem 10 with an impact blow and cause the valve 9 to seat tightly against the valve seat 8. The actuating mechanism carried by the auxiliary casing structure 32 is provided so that a simple and efficient closure of the inlet valve 9 may be effected either by an external thermostatic means or by a manually operated means. The thermostatic bulb element 61 and power element casing 54 would normally enclose a thermal expansive fluid which would, upon expansion, move the diaphragm 55 and actuating pin 43 to move the lever 38 and thus engage and pivot the latch member 26 to release the lever 20 for closure of the valve member 9. The bulb element 61 would normally be positioned as to be responsive to temperature of the liquid fuel burner so that supply of fuel to the burner would be automatically cut off in event of excessive rise in temperature thereof. It should be noted that the power element 53 or a conventional modification thereof could be connected for pressure response instead of temperature response so that the trip mechanism could be operated in response to pressure as in a steam heating system. The lever 40 and its operating linkage 52 provide a simple means for resetting the valve closing lever 20 from a remote point.

It should be noted at this point that this structure has particular utility in floor furnaces in which the fuel controlling valve is positioned some distance below the floor and is usually relatively inaccessible for adjustment from above. The linkage 45 would normally be connected as at 52 to a chain or other linkage for operation from above for resetting the valve closing lever 20. The mechanical trip lever 39 is actuated by the linkage 44 which would be connected by a remotely operated chain or linkage as at 51, and upon upward movement thereof will cause the lever 39 to engage and move the thermostatically operated trip lever 38 for closing the valve.

From the foregoing description it is seen that there is herein provided a novel trip mechanism and valve assembly which provides for closure of the float operated inlet valve either upon excessive rise of liquid level in the float chamber or upon excessive rise in temperature in the burner.

It is also seen that there is provided a very simple trip means for manually tripping the valve closing mechanism from a remote point and for manually resetting the valve closing mechanism from a remote point. It should be further noted that in the event that the temperature of the bulb element 61 increases above that required for trip movement of the lever 38 any excessive movement will be taken up by bodily movement of the power element 53 and sleeve 59 through the aperture 62 and against the spring 65. By the arrangement shown and described herein the auxiliary tripping and reset mechanism is produced for assembly in a casing to provide a unitary control mechanism which can be readily fitted to standard float valve mechanism for operation of the trip and reset members. By mounting this control assembly on the end of the casing the top of the casing is left free for metering control equipment as is usually mounted thereon.

It should be obvious to those skilled in the art that there are numerous modifications which can be made of this invention without departing from the scope and intent thereof as heretofore described and as defined in the appended claims.

Having thus described the invention what is claimed and desired to be secured by Letters Patent of the United States is:

1. The combination with a trip mechanism comprising an actuating member biased for movement in one direction and a pivoted latch member restraining movement of said actuating member, the latch member being biased toward latching engagement with the actuating member and operable upon pivotal movement in one direction to release the same for movement; of a control mechanism comprising a first movable member cooperable with said latch member to pivot the same in said one direction, automatically operated means for moving said movable member, a second movable member cooperable with and operable to move said first movable member to pivot said latch member in said one direction and arranged for manual operation from a remote point, a third movable member cooperable with said actuating member and operable to move the same in the opposite direction for resetting, and said third movable member being arranged for manual operation from a remote point.

2. In a liquid level controlling device, a casing enclosing a liquid receiving chamber and having an inlet, a float operated valve controlling flow through said inlet, safety means for closing said valve upon rise of liquid beyond a predetermined level, said safety means comprising an actuating member biased for engagement with said valve in a valve closing direction, a pivoted latch member engaging said actuating member and latching the same in a position spaced from said valve, said latch member being biased toward a latching engagement with said actuating member, float means engageable with one end of said latch member and operable upon rise in liquid level above said predetermined level to pivot the same to release said actuating member, an auxiliary trip mechanism for pivoting said latch member comprising a first lever cooperable with the other end of said latch member to pivot the same, an expansible and contractable power element responsive to a condition external of said casing and operable upon occurrence of a predetermined condition to move said lever to trip said latch member, a second lever arranged for manual operation at a remote point and operable upon movement to trip said latch member, and a third lever arranged for manual operation at a remote point and cooperable with said actuating member to return the same to a latching position after release thereof.

3. In a liquid level controlling device, a casing enclosing a liquid receiving chamber and having an inlet, a float operated valve controlling flow through said inlet, safety means for closing said valve upon rise of liquid beyond a predetermined level, said safety means comprising an actuating member biased for engagement with said valve in a valve closing direction, a pivoted latch member engaging said actuating member and latching the same in a position spaced from said valve, said latch member being biased toward a latching engagement with said actuating member, float means engageable with one end of said latch member and operable upon rise in liquid level above said predetermined level to pivot the same to release said actuating member, an auxiliary trip mechanism for pivoting said latch member comprising a first movable member cooperable with the other end of said latch member to pivot the same, an expansible and contractable power element responsive to a condition external of said casing and operable upon occurrence of a predetermined condition to move said movable member to trip said latch member, a second movable member arranged for manual operation at a remote point and cooperable with and operable to move said first movable member to trip said latch member, and a third movable member arranged for manual operation at a remote point and cooperable with said actuating member to return the same to a latching position after release thereof.

4. In a liquid level controlling device for controlling flow of fuel to a liquid fuel burner, a casing enclosing a liquid receiving chamber and having an inlet, a float operated valve controlling flow through said inlet; a valve closing mechanism including a trip member and a reset member, said trip member having a first portion within said casing and a second portion extending outside said casing; float operated means engageable with said first trip member portion upon rise of liquid level above a predetermined level to trip the same and cause said valve closing mechanism to close said valve; thermostatic means to close said valve upon excessive rise in temperature comprising a lever engageable with said second trip member portion for tripping the same, and a thermostatic power element operable upon predetermined rise in temperature to move said lever into said tripping engagement; manual means for closing said valve comprising a manually operated lever engageable with said last-named lever to move the same into said tripping engagement, and manually operated means for resetting said valve closing mechanism comprising a lever cooperable with said reset member to move the same to a reset position after a valve closing operation.

5. In a liquid level controlling device for controlling flow of fuel to a liquid fuel burner, a casing enclosing a liquid receiving chamber and having an inlet, a float operated valve controlling flow through said inlet; a valve closing mechanism including a trip member and a reset member, said trip member having a first portion within said casing and a second portion extending outside said casing; float operated means engageable with said first trip member portion upon rise of liquid level above a predetermined level to trip the same and cause said valve closing mechanism to close said valve; thermostatic means to close said valve upon excessive rise in temperature comprising a lever engageable with said second trip member portion for tripping the same, and a thermostatic power element operable upon predetermined rise in temperature to move said lever into said tripping engagement; manual means for closing said valve comprising a manually operated lever engageable with said last-named lever to move the same into said tripping engagement, manually operated means for resetting said valve closing mechanism comprising a lever cooperable with said reset member to move the same to a reset position after a valve closing operation, an auxiliary casing adapted for connection to one end of said valve casing; and said auxiliary casing enclosing and carrying said tripping levers, said resetting lever, and said power element for connection to and removal from said valve casing as a unitary control mechanism.

6. In a liquid level controlling device for controlling flow of fuel to a liquid fuel burner, a casing enclosing a liquid receiving chamber and having an inlet, a float operated valve controlling flow through said inlet; a valve closing mechanism including a trip member and a reset member, said trip member having a first portion within said casing and a second portion extending outside said casing; float operated means engageable with said first trip member portion upon rise of liquid level above a predetermined level to trip the same and cause said valve closing mechanism to close said valve; thermostatic means to close said valve upon excessive rise in temperature comprising a lever engageable with said second trip member portion for tripping the same, and a thermostatic power element operable upon predetermined rise in temperature to move said lever into said tripping engagement; manual means for closing said valve comprising a manually operated lever engageable with said last-named lever to move the same into said tripping engagement, manually operated means for resetting said valve closing mechanism comprising a lever cooperable with said reset member to move the same to a reset position after a valve closing operation, a pair of linkages reciprocally mounted vertically at one end of said valve casing, said linkages each being apertured at their lower ends for connection one to each respectively of said manually operated trip and reset levers, and each of said linkages being apertured at their upper ends for connection to remote operating linkages and operable upon upward movement of one to trip said trip member and upon upward movement of the other to reset said reset member.

7. In a liquid level controlling device for controlling flow of fuel to a liquid fuel burner, a casing enclosing a liquid receiving chamber and having an inlet, a float operated valve controlling flow through said inlet; a valve closing mechanism including a trip member and a reset member, said trip member having a first portion within said casing and a second portion extending outside said casing; float operated means engageable with said first trip member portion upon rise of liquid level above a predetermined level to trip the same and cause said valve closing mechanism to close said valve; thermostatic means to close said valve upon excessive rise in temperature comprising a lever engageable with said second trip member portion for tripping the same, and a thermostatic power element operable upon predetermined rise in temperature to move said lever into said tripping engagement; manual means for closing said valve comprising a manually operated lever engageable with said last-named lever to move the same into said tripping engagement, manually operated means for resetting said valve closing mechanism comprising a lever cooperable with said reset member to move the same to a reset position after a valve closing operation, an auxiliary casing adapted for connection to one end of said valve casing; said auxiliary casing enclosing and carrying said tripping levers, said resetting lever, and said power element for connection to and removal from said valve casing as a unitary control mechanism, a pair of linkages reciprocally mounted vertically on said auxiliary casing, said linkages each being apertured at their lower ends for connection one to each respectively of said manually operated trip and reset levers, and each of said linkages being apertured at their upper ends for connection to remote operating linkages and operable upon upward movement of one to trip said trip member and upon upward movement of the other to reset said reset member.

8. The combination with a trip mechanism comprising an actuating member biased for movement in one direction and a pivoted latch member restraining movement of said actuating member, the latch member being biased toward latching engagement with the actuating member and operable upon pivotal movement in one direction to release the same for movement; of a control mechanism comprising a first lever cooperable with said latch member to pivot the same in said one direction, means for moving said lever, a second lever cooperable with and operable to move said first lever to pivot said latch member in said one direction, means for moving said second lever, a movable member cooperable with said actuating member and operable to move the same in the opposite direction for resetting, and means for moving said movable member.

9. The combination with a trip mechanism comprising an actuating member biased for movement in one direction and a pivoted latch member restraining movement of said actuating member, the latch member being biased toward latching engagement with the actuating member and operable upon pivotal movement in one direction to release the same for movement; of a control mechanism comprising a first lever cooperable with said latch member to pivot the same in said one direction, means for moving said lever, a second lever cooperable with and operable to move said first lever to pivot said latch member in said one direction, means for moving said second lever, a movable member cooperable with said actuating member and operable to move the same in the opposite direction for resetting, means for moving said movable member, and a casing carrying said levers as a unitary control mechanism.

10. In a trip and reset mechanism for controlling operation of the trip and reset members of a safety mechanism, a casing, a plurality of movable members carried by said casing and comprising, a first movable member for actuating a trip member, a second movable member for actuating a reset member, a third movable member engageable with and operable to move said first movable member for tripping operation, and means for moving said movable members for tripping or for resetting as the state of operation of the mechanism may require.

11. In a trip and reset mechanism for controlling operation of the trip and reset members of a safety mechanism, a casing, a plurality of levers carried by said casing and comprising, a first lever for actuating a trip member, a second lever for actuating a reset member, a third lever engageable with and operable to move said first lever for tripping operation, and separate means for moving said levers for tripping or for resetting as the state of operation of the mechanism may require, said lever moving means including automatically operated means for actuating said first lever.

12. In a trip and reset mechanism for controlling operation of the trip and reset members of a safety mechanism, a casing, a plurality of movable members carried by said casing and comprising, a first movable member for actuating a trip member, a second movable member for actuating a reset member, a third movable member engageable with and operable to move said first movable member for tripping operation, and separate means for moving said movable members for tripping or for resetting as the state of operation of the mechanism may require, said moving means including a thermostatic power element for moving said first movable member and remote manually operated means for moving said second and third movable members.

13. In a liquid level controlling device for controlling flow of fuel to a liquid fuel burner, a casing enclosing a liquid receiving chamber and having an inlet, a float operated valve controlling flow through said inlet; a valve closing mechanism including a trip member and a reset member, said trip member having a first portion within said casing and a second portion extending outside said casing; float operated means engageable with said first trip member portion upon rise of liquid level above a predetermined level to trip the same and cause said valve closing mechanism to close said valve; thermostatic means to close said valve upon excessive rise in temperature comprising a lever engageable with said second trip member portion for tripping the same, and a thermostatic power element operable upon predetermined rise in temperature to move said lever into said tripping engagement; manual means for closing said valve comprising a manually operated movable member engageable with said lever to move the same into said tripping engagement, and manually operated means for resetting said valve closing mechanism comprising a remotely operated movable member cooperable with said reset member to move the same to a reset position after a valve closing operation.

CARL H. MILLERWISE.

REFERENCES CITED

The following references are of record in the file of this patent:

UNITED STATES PATENTS

| Number | Name | Date |
| --- | --- | --- |
| 1,488,042 | Bonsouland | Mar. 25, 1924 |
| 1,715,540 | Edwards | June 4, 1929 |
| 2,292,568 | Kanter | Aug. 11, 1942 |
| 2,346,813 | Breese | Apr. 18, 1944 |
| 2,389,519 | Landon | Nov. 20, 1945 |